Aug. 14, 1951  A. B. SINKLER ET AL  2,564,650
PALLET STONE SETTING TOOL
Filed Oct. 28, 1946

INVENTORS.
ARTHUR B. SINKLER
EGBERT VAN HAAFTEN
BY
ATTY.

Patented Aug. 14, 1951

2,564,650

UNITED STATES PATENT OFFICE 2,564,650

PALLET STONE SETTING TOOL

Arthur Brock Sinkler and Egbert Van Haaften, Lancaster, Pa., assignors to Hamilton Watch Company, Lancaster, Pa.

Application October 28, 1946, Serial No. 706,148

3 Claims. (Cl. 81—7)

This invention relates to a tool for determining the effective length of the pallet stones when mounted in the pallet.

The object of the present invention is to provide a tool by means of which the pallet stones may be correctly set in the pallet, using a gage conforming to the path of the balance wheel roller jewel and a means for measuring the distance between said gage and the point at which the pallet stones contact the escape wheel.

A further object of the present invention is to provide a tool by means of which the pallet stones may be correctly set in the pallet without the necessity of putting the pallet in a watch.

A further object of the present invention is to provide a tool for determining the correct distance between the curve of the pallet fork and the extreme outer edge of the pallet stones and also to provide means for adjusting these means within certain limits to make exceedingly fine adjustment possible.

Pallet stones which are generally formed of synthetic ruby or sapphire are adjustably mounted in slots in the pallet and held in position by shellac. It is necessary in the manufacture of fine watches to make an initial setting of these stones and change the setting for each watch. The tool forming the subject of this invention is designed to make that setting of the stones under such conditions as to make it unnecessary to make but one setting.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The tool is shown in the accompanying drawing in which.

Figure 1:
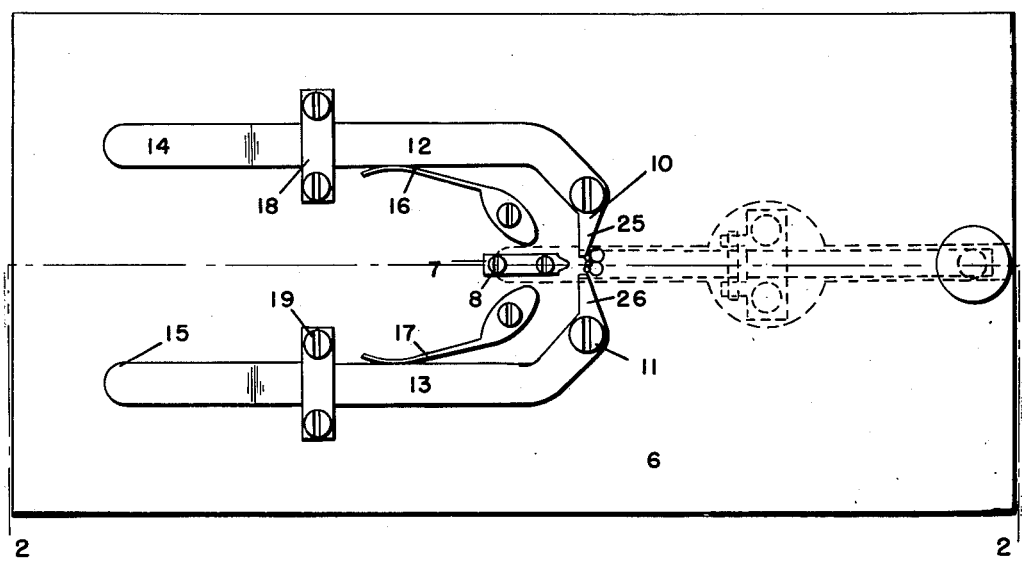
Figure 1 is a top plan view of the tool.
Figure 2:
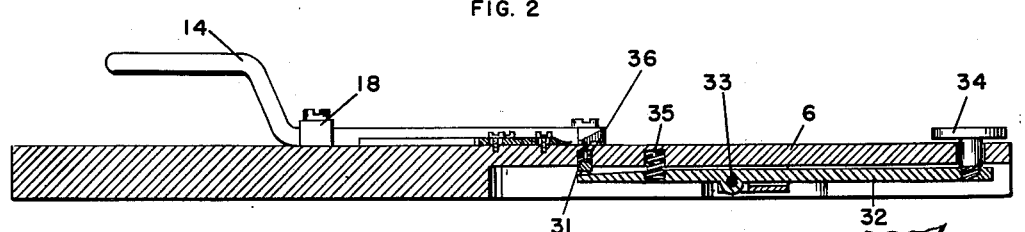
Figure 2 is a cross-section on line 2—2 of Figure 1.

The invention, as shown in the drawing, comprises a base 6 on which is mounted a stationary gage 7 which is held in position by a pair of screws 8 passing through elongated slots 9 into the gage to provide a longitudinal adjustment of the gage.

Pivotally mounted on the base 6 by pivot pins 10 and 11 are a pair of levers 12 and 13 which are manually operable through the raised handle portions 14 and 15. A pair of springs 16 and 17 constantly urge the handle ends of the levers apart. A pair of keepers 18 and 19 restrict the movement of the levers to within certain limits.

Adjacent the operating ends of the levers are a pair of cams 20 and 21 having kerfs to permit easy rotation. These cams are in the form of flat head screws having off center shanks so that turning will provide an adjustment of the distance between the edge of the cams and the gaging faces 22 and 23 of the gage 7. A pin 24 is permanently fixed at a position substantially between the screw cams 20 and 21 and the operating ends 25 and 26 of the levers 12 and 13. This pin 24 serves as the pivot point for a pallet 27.

A hole 28 is located beneath and extending beyond the fork engaging faces of the gage 7 and a light placed below the base permits an operator to very accurately determine when the fork of the pallet is brought into engagement with the gaging faces of the gage 7.

A pair of pins 29 and 30 are mounted in a block 31 and are vertically movable in the base 1. These pins are located directly beneath the pallet and upon movement of a lever 32 about its pivot 33 through the action of the release button 34, the pins are pushed upward to engage the under surface of the pallet thus very gently releasing it from the pivot pin 24. Springs 35 and 36 return the pins 29 and 30 to inoperative position.

Figure 3:
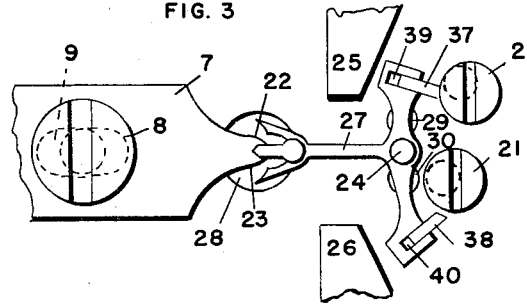
Figure 3 is a greatly enlarged view showing the pallet in its initial position.
Figure 4:
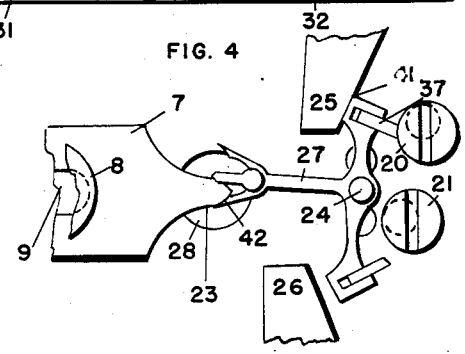
Figure 4 shows the pallet in one extreme position with one side of the fork against the gage, the effective length of one pallet stone being determined.
Figure 5:
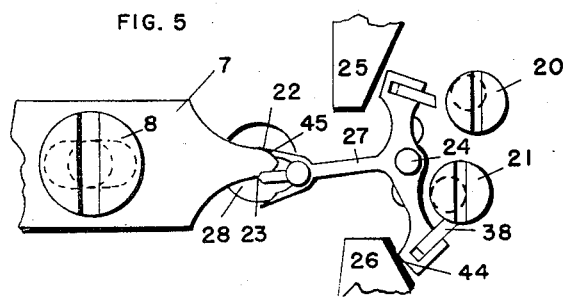
Figure 5 is a view similar to Figure 4 showing the opposite side of the fork in engagement with the gage and the effective length of the opposite stone being determined.

In operation the tool is used by placing a pallet 27 on the pin 24, as shown in Figure 3, with the pallet stones 37 and 38 held in the slots 39 and 40 respectively. These stones are set by hand and placed so that they are in an extended position. Movement of the lever 12 by the handle 14 brings the end 25 into engagement with the pallet at 41 pivoting the pallet about the pin 24 until one side 42 of the fork comes into engagement with the gage face 23 of the gage 7. Because of the light coming up through the hole 28, it is very easy to determine the instant of contact between the faces 42 and 23. It must be, of course, remembered that this is a very delicate operation and one which is always done by a skilled operator. At the moment of contact of the faces 42 and 23, the stone 37 is seated in the slot 39 so that its effective length is correct. A similar operation is carried out by moving the handle 15 of the lever 13 bringing the face 26 into engagement with the pallet at 44 and the face of the fork 45 into engagement with the face 22 of the gage. In the matter above described, this seats the pallet stone 38 correctly. It is then only necessary to put a drop of hot liquid shellac in the slot 39 behind the pallet stone which effectively retains the stone in desired position.

The faces 23 and 22 of the gage 7 are very accurately determined and conform to the path of the surface of the balance wheel roller jewel which engages the pallet fork. By very accurately measuring and determining the distance between the face 22 and the point of engagement with the pallet stone 38 and the cam 21, it is only necessary to make one setting of the pallet stones.

What is claimed is:

1. A pallet stone setting tool, comprising a base, a stationary gage mounted upon said base, said gage having a pair of pallet fork horn engaging faces, the contour of said faces conforming respectively to the line of contact of a balance wheel roller jewel with its respective pallet fork horn, a stationary pin mounted on said base and serving as a pivot for the pallet, said pin being located with respect to said stationary gage so that pivotal movement of a pallet fork mounted on said pin will bring said pallet horns into engagement with their respective gage faces, a pair of adjustable cams carried by said base and located in the path of the pallet stones of said pallet fork upon movement of the pallet fork about the pivot pin and manually operated means pivotally mounted on the base and engaging the pallet directly in back of the stone slot, said manually operated means moving said pallet about said stationary pin until the horn face is brought into engagement with the gage, the pallet stone during such pivotal movement of the pallet engaging said cam and seating itself in said slot.

2. A pallet stone setting tool according to claim 1, wherein the stone engaging cams are adjustable to accurately determine the final position of the pallet stone in the slot.

3. A pallet stone setting tool, comprising a base, a stationary gage mounted upon said base, said gage having a pair of pallet fork horn engaging faces, the contour of said faces conforming respectively to the line of contact of a balance wheel roller jewel with its respective pallet fork horn, a stationary pin mounted on said base and serving as a pivot for the pallet, said pin being located with respect to said stationary gage so that pivotal movement of a pallet fork mounted on said pin will bring said pallet horns into engagement with their respective gage faces, a pair of adjustable cams carried by said base and located in the path of the pallet stones of said pallet fork upon movement of the pallet fork about the pivot pin, a pair of pivoted levers fastened to said base on either side of the pallet fork, one end of the levers adapted to engage the pallet at the rear of the pallet stone slot to rotate said pallet about the pivot, bringing the pallet stones respectively into engagement with said adjustable cams simultaneously with the engagement of the pallet horn face with the respective face of the stationary gage.

ARTHUR BROCK SINKLER.
EGBERT VAN HAAFTEN.

REFERENCES CITED

The following references are of record in the file of this patent:

UNITED STATES PATENTS

| Number | Name | Date |
| --- | --- | --- |
| 865,925 | Miller | Sept. 10, 1907 |
| 1,016,829 | Hurwitz | Feb. 6, 1912 |
| 1,596,126 | Strutz | Aug. 17, 1926 |

FOREIGN PATENTS

| Number | Country | Date |
| --- | --- | --- |
| 126,620 | Switzerland | July 2, 1928 |